United States Patent
Sakamoto

(10) Patent No.: US 11,424,071 B2
(45) Date of Patent: Aug. 23, 2022

(54) POWER CONVERSION DEVICE

(71) Applicant: Mitsubishi Electric Corporation, Tokyo (JP)

(72) Inventor: Tatsuro Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 237 days.

(21) Appl. No.: 16/614,832

(22) PCT Filed: Apr. 9, 2018

(86) PCT No.: PCT/JP2018/014900
§ 371 (c)(1),
(2) Date: Nov. 19, 2019

(87) PCT Pub. No.: WO2019/012760
PCT Pub. Date: Jan. 17, 2019

(65) Prior Publication Data
US 2020/0203064 A1    Jun. 25, 2020

(30) Foreign Application Priority Data

Jul. 10, 2017   (JP) .............................. JP2017-134411

(51) Int. Cl.
| | |
|---|---|
| *H01F 27/36* | (2006.01) |
| *H01F 27/22* | (2006.01) |
| *H01F 27/28* | (2006.01) |
| *H01F 27/29* | (2006.01) |
| *H01F 27/30* | (2006.01) |
| *H01F 30/06* | (2006.01) |
| *H02M 3/335* | (2006.01) |

(52) U.S. Cl.
CPC ........... *H01F 27/366* (2020.08); *H01F 27/22* (2013.01); *H01F 27/289* (2013.01);
(Continued)

(58) Field of Classification Search
CPC ...... H01F 27/36; H01F 27/22; H01F 27/2885; H01F 27/289; H01F 27/29; H01F 27/306;
(Continued)

(56) References Cited

U.S. PATENT DOCUMENTS

| | | | |
|---|---|---|---|
| 2010/0301981 A1 | 12/2010 | Zeng et al. | |
| 2013/0328655 A1* | 12/2013 | Catalano | ................. H01F 5/003 336/200 |

(Continued)

FOREIGN PATENT DOCUMENTS

| | | |
|---|---|---|
| DE | 24 09 881 A1 | 9/1975 |
| GB | 2489532 A | 10/2012 |

(Continued)

OTHER PUBLICATIONS

Communication dated Jan. 14, 2021, from the European Patent Office in European Application No. 18832850.4.
(Continued)

*Primary Examiner* — Tuyen T Nguyen
(74) *Attorney, Agent, or Firm* — Sughrue Mion, PLLC; Richard C. Turner

(57) ABSTRACT

A power conversion device includes an isolation transformer, the isolation transformer including: a primary winding; a secondary winding; and a magnetic shield portion configured to suppress magnetic interference between the primary winding and the secondary winding by interrupting a magnetic flux generated by a current flowing through each of the primary winding and the secondary winding. The magnetic shield portion is formed of, for example, a magnetic shield plate arranged between the primary winding and the secondary winding.

8 Claims, 8 Drawing Sheets

(52) U.S. Cl.
CPC ......... *H01F 27/2885* (2013.01); *H01F 27/29* (2013.01); *H01F 27/306* (2013.01); *H01F 27/36* (2013.01); *H01F 30/06* (2013.01); *H02M 3/33592* (2013.01)

(58) Field of Classification Search
CPC .... H01F 30/06; H01F 30/10; H02M 3/33592; H02M 3/3376
See application file for complete search history.

(56) References Cited

U.S. PATENT DOCUMENTS

| | | |
|---|---|---|
| 2014/0347159 A1 | 11/2014 | Zuo et al. |
| 2016/0314896 A1 | 10/2016 | Dong et al. |
| 2017/0178787 A1 | 6/2017 | Massolini et al. |

FOREIGN PATENT DOCUMENTS

| | | | |
|---|---|---|---|
| JP | 06342725 | A * | 12/1994 |
| JP | 07-283044 | A | 10/1995 |
| JP | 2015-156461 | A | 8/2015 |
| JP | 2015159173 | A | 9/2015 |
| JP | 2015-226443 | A | 12/2015 |
| JP | 2016-208560 | A | 12/2016 |

OTHER PUBLICATIONS

Communication dated Mar. 25, 2020 from European Patent Office in EP Application No. 18832850.4.
International Search Report for PCT/JP2018/014900, dated Jun. 5, 2018.

* cited by examiner

POWER CONVERSION DEVICE

CROSS REFERENCE TO RELATED APPLICATIONS

This application is a National Stage of International Application No. PCT/JP2018/014900 filed Apr. 9, 2018, claiming priority based on Japanese Patent Application No. 2017-134411 filed Jul. 10, 2017.

TECHNICAL FIELD

The present invention relates to a power conversion device including an isolation transformer.

BACKGROUND ART

An isolated power conversion device capable of electrically isolating input and output, for example, between systems or between power supplies is widely used (see, for example, Patent Literature 1). For example, in recent years, an electric automobile, a plug-in hybrid vehicle, and other such electric vehicle have been developed. For such an electric vehicle, the isolated power conversion device is used as an in-vehicle charger configured to charge a high voltage battery from a household power supply. There is a constant demand for reduction in size of such a power conversion device in order to improve its loading property on the electric vehicle.

In the isolated power conversion device, an isolation transformer is used for the purpose of electrical isolation and voltage conversion between a power supply on the input side and a load on the output side. The isolation transformer includes: a core (also referred to as "transformer core") mainly composed of iron; and a primary winding and a secondary winding wound around the core. In the insulation transformer, the number of turns corresponding to a target transformation ratio is set for each of the primary winding and the secondary winding.

In general, a method of increasing a switching frequency of a switching element is used as a method for achieving the reduction in size of the power conversion device. This is because it is possible to reduce a voltage-time product (VT product) of the isolation transformer and a loss of the core (iron loss) by increasing the switching frequency, with the result that the core can be reduced in size.

However, as the switching frequency increases, a resistance value of the winding and a loss of the winding (copper loss) increase due to a skin effect and magnetic interference (proximity effect) between the primary winding and secondary winding. In this case, as the copper loss increases, the temperature of the winding increases. In order to prevent the temperature of the winding from exceeding an upper temperature limit of the winding, it is required to increase the cross sectional area of the winding to reduce a winding loss, and to provide the winding with a cooling mechanism, with the result that the isolation transformer becomes large-sized.

CITATION LIST

Patent Literature

[PTL 1] JP 2016-208560 A

SUMMARY OF INVENTION

Technical Problem

As described above, there is a demand for further reduction in size of a power conversion device. To that end, it is mandatory to reduce the size of an isolation transformer being a main component. In order to reduce the size of the isolation transformer, it is required to increase a switching frequency of a switching element. However, as the switching frequency increases, a resistance value of the winding and a loss of the winding increase, which imposes a limitation on the reduction in size of the isolation transformer.

The present invention has been made in order to solve such a problem as described above, and has an object to obtain a power conversion device for achieving reduction in size by devising a configuration of the isolation transformer.

Solution to Problem

A power conversion device according to one embodiment of the present invention, includes an isolation transformer, the isolation transformer including: a primary winding; a secondary winding; and a magnetic shield portion configured to suppress magnetic interference between the primary winding and the secondary winding by interrupting a magnetic flux generated by a current flowing through each of the primary winding and the secondary winding.

Advantageous Effects of Invention

According to the one embodiment of the present invention, there can be obtained the power conversion device for achieving reduction in size by devising a configuration of the isolation transformer.

DESCRIPTION OF EMBODIMENTS

Now, a power conversion device according to exemplary embodiments of the present invention is described referring to the accompanying drawings. In the illustration of the drawings, the same components or corresponding components are denoted by the same reference symbols, and the repetitive description thereof is herein omitted.

First Embodiment

Figure 1:
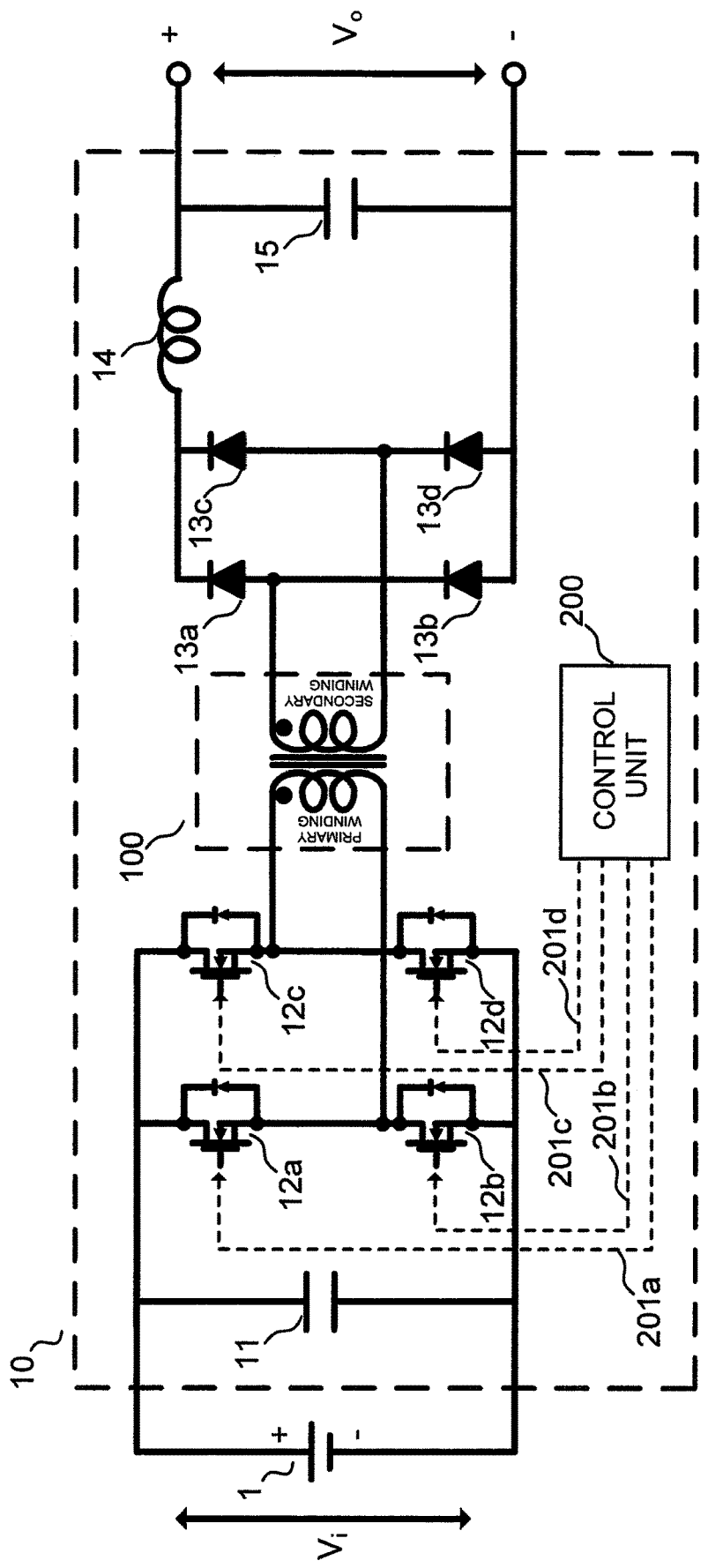
FIG. 1 is a schematic configuration diagram of a power conversion device according to a first embodiment of the present invention.

FIG. 1 is a schematic configuration diagram of a power conversion device 10 according to a first embodiment of the present invention. In FIG. 1, an exemplary case in which an input voltage Vi is input from a DC power supply 1 on the input side of the power conversion device 10 and an output voltage Vo is output on the output side of the power conversion device 10 is illustrated.

In FIG. 1, the power conversion device 10 is formed of a full-bridge DC/DC converter circuit. The power conversion device 10 includes a plurality of components, specifically, a smoothing capacitor 11, semiconductor switching elements 12a and 12b forming a switching element pair, semiconductor switching elements 12c and 12d forming a switching element pair, rectifier diodes 13a to 13d forming a rectifier circuit, a smoothing reactor 14, a smoothing capacitor 15, an isolation transformer 100 including a primary winding and a secondary winding, and a control unit 200.

The smoothing capacitor 11 and the semiconductor switching elements 12a to 12d are arranged on the primary side of the isolation transformer 100. The rectifier circuit formed of the rectifier diodes 13a to 13d is arranged on the secondary side of the isolation transformer 100, and the smoothing reactor 14 and the smoothing capacitor 15 are arranged on the subsequent stage of the rectifier circuit. The control unit 200 is arranged outside a main circuit.

The semiconductor switching elements 12a to 12d are each formed of, for example, a metal oxide semiconductor field effect transistor (MOSFET) in which a diode is built between a source and a drain. The drain terminals of the semiconductor switching elements 12a and 12c are connected to the positive electrode of the DC power supply 1 via one terminal of the smoothing capacitor 11. The source terminals of the semiconductor switching elements 12b and 12d are connected to the negative electrode of the DC power supply 1 via the other terminal of the smoothing capacitor 11.

One terminal of the primary winding of the isolation transformer 100 is connected to the source terminal of the semiconductor switching element 12a and the drain terminal of the semiconductor switching element 12b. The other terminal of the primary winding of the isolation transformer 100 is connected to the source terminal of the semiconductor switching element 12c and the drain terminal of the semiconductor switching element 12d.

One terminal of the secondary winding of the isolation transformer 100 is connected to the anode terminal of the rectifier diode 13a and the cathode terminal of the rectifier diode 13b. The other terminal of the secondary winding of the isolation transformer 100 is connected to the anode terminal of the rectifier diode 13c and the cathode terminal of the rectifier diode 13d.

One terminal of the smoothing reactor 14 is connected to the cathode terminals of the rectifier diode 13a and the rectifier diode 13c. The other terminal of the smoothing reactor 14 is connected to the positive electrode on the output side via one terminal of the smoothing capacitor 15. The anode terminals of the rectifier diode 13b and the rectifier diode 13d are connected to the negative electrode on the output side via the other terminal of the smoothing capacitor 15.

The control unit 200 is implemented by, for example, a microcomputer configured to execute arithmetic operation processing, a read only memory (ROM) configured to store program data, fixed value data, and other such data, and a random access memory (RAM) capable of updating and sequentially rewriting the stored data. The control unit 200 performs switching control on the semiconductor switching elements 12a to 12d so that electric power supplied from the DC power supply 1 can be converted. Specifically, the control unit 200 transmits control signals 201a to 201d, to thereby perform the switching control on the semiconductor switching elements 12a to 12d between on and off so that the output voltage Vo reaches a target value.

Figure 2:
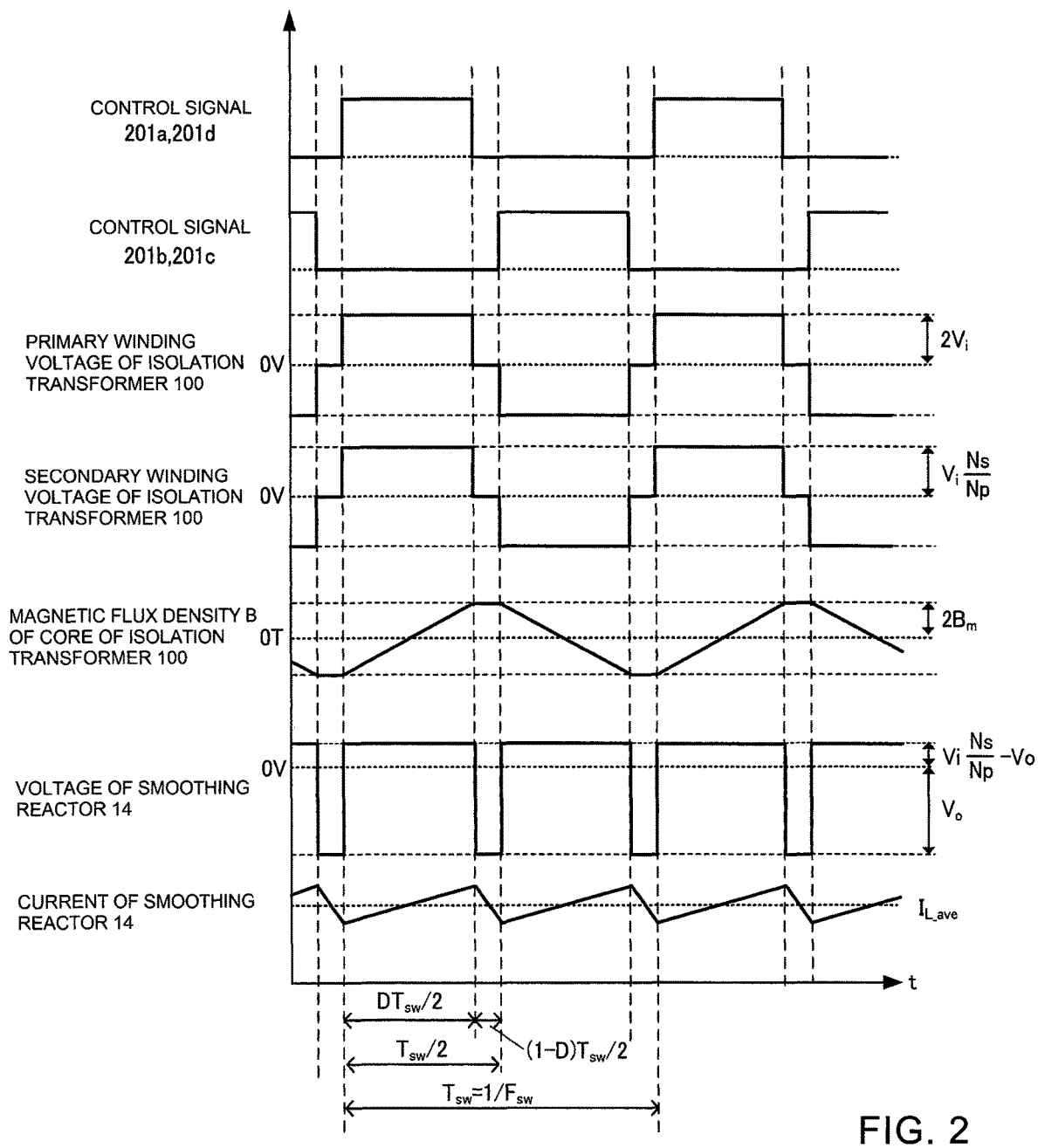
FIG. 2 is a timing chart for illustrating an example of temporal changes of control signals for controlling semiconductor switching elements illustrated in FIG. 1, a primary winding voltage and a secondary winding voltage of an isolation transformer, a magnetic flux density of a core of the isolation transformer, and a voltage and a current of a smoothing reactor.

Next, a basic operation principle of the power conversion device 10 illustrated in FIG. 1 is described with reference to FIG. 2. FIG. 2 is a timing chart for illustrating an example of temporal changes of the control signals 201a to 201d for controlling the semiconductor switching elements 12a to 12d illustrated in FIG. 1, a primary winding voltage and a secondary winding voltage of the isolation transformer 100, a magnetic flux density B of a core of the isolation transformer 100, and a voltage and a current of the smoothing reactor 14.

In FIG. 2, a switching frequency of the semiconductor switching elements 12a to 12d is represented by Fsw, a switching cycle period is represented by Tsw, and a conduction ratio is represented by D. In addition, Np and Ns represent the numbers of turns of the primary winding and the secondary winding, respectively, of the isolation transformer 100. Bm represents an operation magnetic flux density of the core of the isolation transformer 100.

As illustrated in FIG. 2, the control unit 200 performs the switching control on the semiconductor switching elements 12a and 12d and the semiconductor switching elements 12b and 12c between on and off so as to have a 180° phase difference (½(Tsw)) at a switching timing with the same on-time.

Through the switching of the semiconductor switching elements 12a to 12d between on and off, a voltage corresponding to the input voltage Vi from the DC power supply 1 is applied to the primary winding of the isolation transformer 100, and a voltage being the product of the input voltage Vi and a ratio (=Ns/Np) of the numbers of turns of the secondary winding to the primary winding is generated in the secondary winding of the isolation transformer 100.

The voltage generated in the secondary winding of the isolation transformer 100 is rectified by the rectifier diodes 13a to 13d, and is smoothed by the smoothing reactor 14 and the smoothing capacitor 15 to be output as the output voltage Vo.

In this case, the output voltage Vo smoothed by the smoothing reactor 14 and the smoothing capacitor 15 is expressed by Expression (1). For the sake of simplicity, no consideration is given here to a forward voltage drop in the rectifier diodes 13a to 13d.

$$V_o = D \cdot V_i \frac{N_s}{N_p} \quad (1)$$

As can be seen from Expression (1), the numbers of turns of the primary winding and the secondary winding of the isolation transformer 100 are set so as to satisfy the input/output voltage range of the power conversion device 10.

The operation magnetic flux density Bm of the core of the isolation transformer 100 is required to set to equal to or smaller than a value (in general, Bm<(about 2×Bs)) obtained in consideration of a design margin with respect to a maximum operation magnetic flux density Bs of a core magnetic material so as to prevent the core from being magnetically saturated.

The operation magnetic flux density Bm of the core of the isolation transformer 100 is proportional to a voltage-time product (VT product) being a product of an applied voltage and an application time period with respect to the winding of the isolation transformer 100, and is expressed by Expression (2) through use of the output voltage Vo. In Expression (2), Ae represents a cross sectional area of the core of the isolation transformer 100.

$$B_m = \frac{V_o}{4 \cdot Fsw \cdot N_s \cdot A_e} \quad (2)$$

As can be seen from Expression (2), by increasing the switching frequency Fsw, the cross sectional area Ae of the core can be reduced, and as a result, the core of the isolation transformer 100 can be reduced in size.

A loss density Pcv of the core of the isolation transformer 100 is expressed by Expression (3). The coefficients k, α, and β each represent a loss coefficient determined by the core magnetic material.

$$P_{cv} = k \cdot F_{sw}^{\alpha} \cdot B_m^{\beta} \quad (3)$$

In Expression (3), the loss coefficient α is smaller than β with a general magnetic material. Therefore, as can be seen from Expression (2), when the operation magnetic flux density Bm is reduced by increasing the switching frequency Fsw, the loss density Pcv of the core can be reduced. In addition, it is possible to achieve reduction in loss of the core (iron loss) along with the reduction in size of the core.

Figure 3:
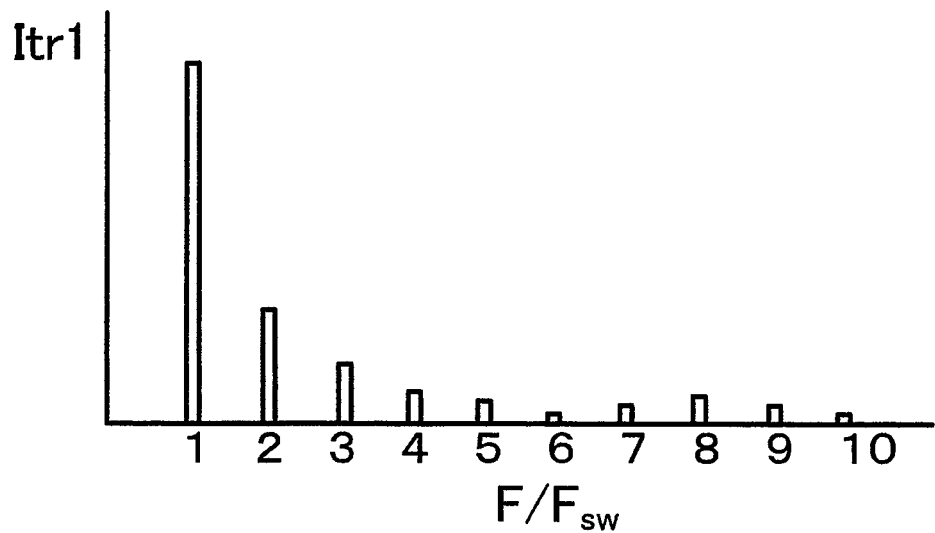
FIG. 3 is an explanatory graph for showing an example of a frequency spectrum of a current flowing through a primary winding of the isolation transformer illustrated in FIG. 1.

Next, a frequency spectrum Itr1 of a current flowing through the primary winding of the isolation transformer 100 is described with reference to FIG. 3. FIG. 3 is an explanatory graph for showing an example of the frequency spectrum Itr1 of the current flowing through the primary winding of the isolation transformer 100 illustrated in FIG. 1.

In FIG. 3, F represents a frequency, and a current spectrum is generated in the primary winding of the isolation transformer 100 at an integral multiple of the frequency with the switching frequency Fsw being used as a fundamental frequency. Therefore, when the switching frequency Fsw is increased, the frequency spectrum Itr1 of the current flowing through the winding of the isolation transformer 100 shifts in a high frequency direction.

Figure 4:
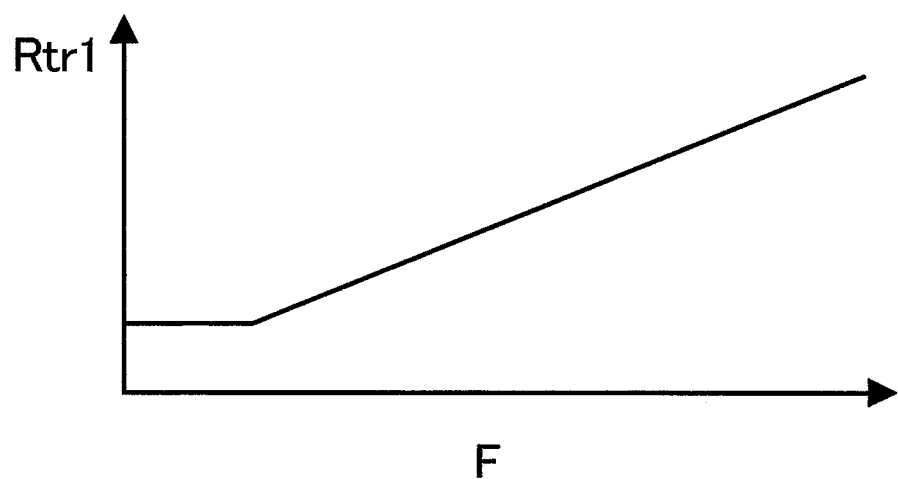
FIG. 4 is an explanatory graph for showing an example of a frequency characteristic of a resistance value of the primary winding of the isolation transformer illustrated in FIG. 1.

Next, a frequency characteristic of a resistance value Rtr1 of the primary winding of the isolation transformer 100 is described with reference to FIG. 4. FIG. 4 is an explanatory graph for showing an example of the frequency characteristic of the resistance value Rtr1 of the primary winding of the isolation transformer 100 illustrated in FIG. 1.

As shown in FIG. 4, the resistance value Rtr1 of the primary winding increases as the frequency F increases. In this case, assuming that a loss of the primary winding is set as Wcoil1, Wcoil1 is expressed by Expression (4) as the product of the resistance value Rtr1 of the primary winding and the frequency spectrum component Itr1 of the current.

$$W_{coil1} = \Sigma R_{tr1}(F) \cdot I_{tr1}(F)^2 \quad (4)$$

As can be seen from Expression (4), when the frequency spectrum Itr1 of the current flowing through the primary winding shifts in a high frequency direction, the resistance value Rtr1 of the primary winding increases, and hence the loss Wcoil1 of the primary winding increases. The secondary winding of the isolation transformer 100 also has the same characteristic as that of the primary winding.

When the losses of the primary winding and the secondary winding of the isolation transformer 100 increase, the temperature of each winding increases. The winding is damaged when the temperature of the winding exceeds an upper temperature limit determined by, for example, the winding and the insulating member of the winding. Therefore, it is required to employ a method of reducing the loss by reducing the resistance value of the winding by increasing the diameter of the winding or a method of cooling the winding by separately providing a cooling mechanism. However, when the diameter of the winding is increased or the cooling mechanism is added, there arises a problem that the isolation transformer 100 becomes large-sized.

The above-mentioned problem relates to a higher switching frequency of a semiconductor switching element, and greatly reduces the effect of reducing an isolation transformer in size due to the higher switching frequency.

With attention being given to the above-mentioned problem, the description of the first embodiment is directed to a configuration of the isolation transformer 100 capable of reducing the resistance values of the primary winding and the secondary winding. The isolation transformer 100 in the first embodiment has a technical feature of including a magnetic shield portion configured to suppress magnetic interference between the primary winding and the secondary winding by interrupting a magnetic flux generated by the current flowing through each of the primary winding and the secondary winding. The first embodiment is described by taking an exemplary case in which such a magnetic shield portion is formed of a magnetic shield plate arranged between the primary winding and the secondary winding.

As described below, owing to the above-mentioned technical feature of the isolation transformer 100, even when the switching frequency of the semiconductor switching elements 12a to 12d is increased, it is possible to achieve the reduction in size of the isolation transformer 100 by suppressing an increase in size of the winding, and to achieve an increase in efficiency of the power conversion device 10.

In contrast, the related art described in Patent Literature 1 has a structure in which a shield plate is arranged between the primary winding and the secondary winding. This structure is intended for noise suppression, and hence it is required to use an electrostatic shield plate configured to suppress potential interference between the primary winding and the secondary winding as the shield plate to fix the potential of an electrostatic shield to a power supply line or a ground line. Therefore, it is clear that the related art described in Patent Literature 1 is different in principle from the above-mentioned technical feature.

Figure 5:
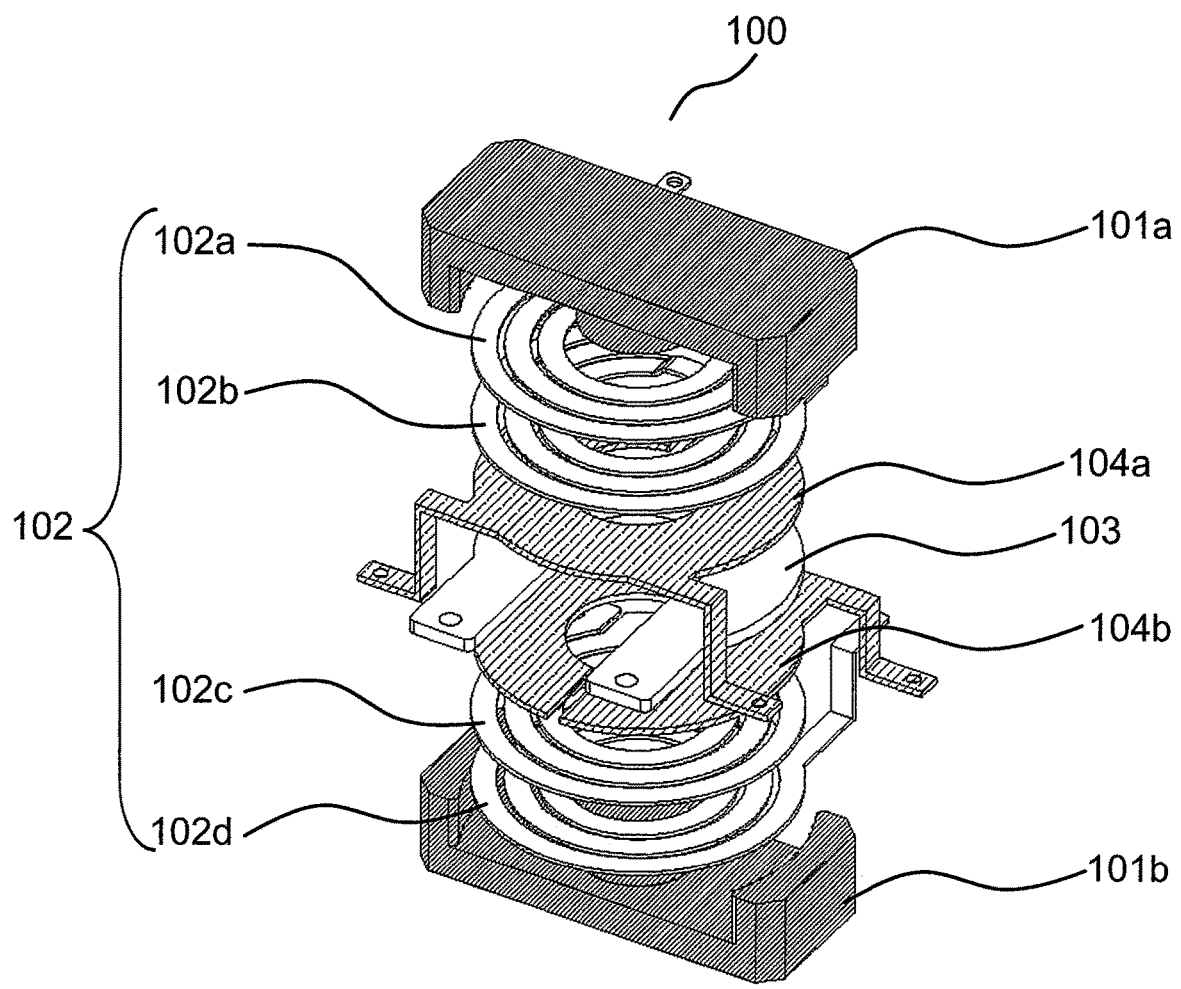
FIG. 5 is a structural view for illustrating an example of a structure of the isolation transformer in the first embodiment of the present invention.
Figure 6:
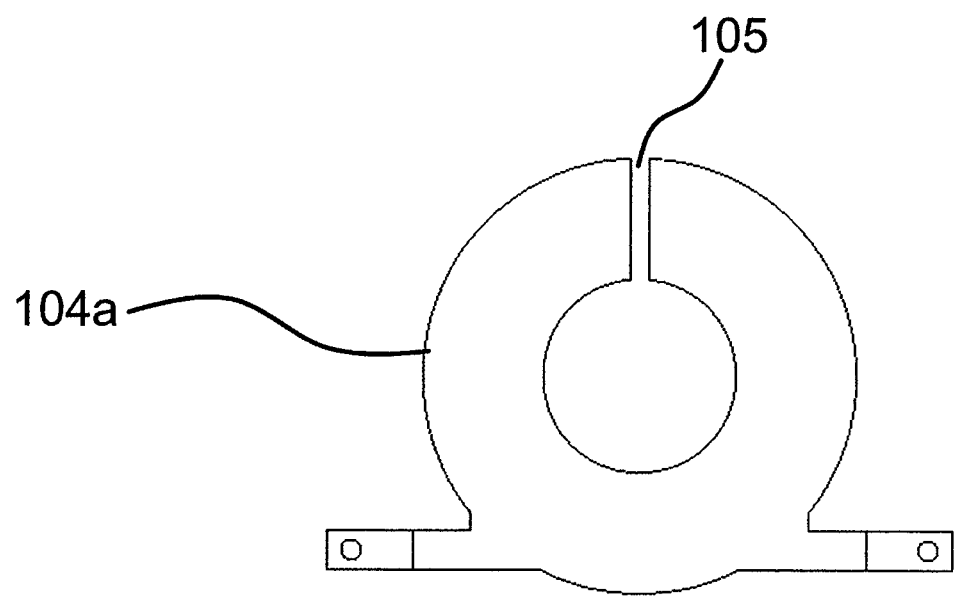
FIG. 6 is a structural diagram of a magnetic shield plate of the isolation transformer in the first embodiment of the present invention.

Next, the configuration of the isolation transformer 100 is described with reference to FIG. 5 and FIG. 6. FIG. 5 is a structural view for illustrating an example of a structure of the isolation transformer 100 in the first embodiment of the present invention. FIG. 6 is a structural diagram of a magnetic shield plate 104a of the isolation transformer 100 in the first embodiment of the present invention. In FIG. 5, the structure of the isolation transformer 100 is illustrated by an exploded perspective view, and in FIG. 6, a structure of the magnetic shield plate 104a is illustrated by a top view.

In FIG. 5, the isolation transformer 100 includes a primary winding 102 divided into two layers of a first winding layer formed of winding portions 102a and 102b and a second winding layer formed of winding portions 102c and 102d, a secondary winding 103 arranged between the layers of the primary winding 102, the magnetic shield plate 104a arranged between the first winding layer and the secondary winding 103, a magnetic shield plate 104b arranged between the secondary winding 103 and the second winding layer, and the core formed of a core piece 101a and a core piece 101b each having an E-shaped cross section.

The primary winding 102, the secondary winding 103, the magnetic shield plate 104a, and the magnetic shield plate 104b are slid onto protruding portions that protrude from the respective centers of the core piece 101a and the core piece 101b, and the end surfaces of the core piece 101a and the core piece 101b are connected to each other. With this structure, the primary winding 102, the secondary winding 103, the magnetic shield plate 104a, and the magnetic shield plate 104b are received in the core.

In FIG. 6, the magnetic shield plate 104a is provided with a slit 105 as such a structure as to prevent conduction in a circumferential direction. The magnetic shield plate 104b has the same structure as that of the magnetic shield plate 104a illustrated in FIG. 6.

Next, a description is given of the principle of reducing the resistance values of the primary winding and the secondary winding in the configuration of the isolation transformer 100 illustrated in FIG. 5.

First, a consideration is given to a case in which the magnetic shield plates 104a and 104b are not provided in the isolation transformer 100 illustrated in FIG. 5. In this case, when the primary winding and the secondary winding are brought to a conductive state, the magnetic flux generated by the current flowing through the primary winding is interlinked to the secondary winding, and the magnetic flux generated by the current flowing through the secondary winding is interlinked to the primary winding.

In the conductor, an induced voltage corresponding to the change amount of the interlinked magnetic flux is generated to cause a current to flow, which biases the current flowing through the conductor. The change amount of the magnetic flux depends on the frequency, and hence as the frequency becomes higher, a current bias in the conductor becomes larger. This magnetic interference is known as a proximity effect. For example, in the primary winding and the secondary winding of the isolation transformer 100, currents flow through the primary winding and the secondary winding so as to be opposed to each other, and hence the flowing currents cause a current bias inside each winding in a direction of attracting each other. The case in which a current bias occurs inside each winding is equivalent to a case in which the cross section of each winding is reduced, and as a result, the resistance value of each winding increases.

In view of this, the isolation transformer 100 illustrated in FIG. 5 is configured such that, between the primary winding and the secondary winding, a magnetic shield plate configured to interrupt a magnetic flux generated by the current flowing through each winding is arranged. With this configuration of the isolation transformer 100, it is possible to suppress the magnetic interference (proximity effect) between the primary winding and the secondary winding, and as a result, to suppress an increase in resistance value of the winding.

In the configuration of the isolation transformer 100, when the number of magnetic shield plates arranged between the primary winding and the secondary winding is one or more, the above-mentioned effect can be achieved, and the more magnetic shield plates are more effective.

In the configuration of the isolation transformer 100, the magnetic shield plates 104a and 104b may be connected to a casing configured to receive the components of the power conversion device 10. In another case, the magnetic shield plates 104a and 104b may be connected to a heat sink configured to cool the components of the power conversion device 10. With this configuration of the isolation transformer 100, heat generated in the primary winding and the secondary winding can be reduced for cooling by the casing or the heat sink through the magnetic shield plate. As a result, it is possible to achieve the further reduction in size of the isolation transformer 100.

When the magnetic shield plates 104a and 104b are electrically connected to the casing or the heat sink, the magnetic shield plate can be directly fixed to the casing or the heat sink, and hence it is possible to further simplify the configuration of the power conversion device 10.

In the first embodiment, of the windings arranged in the core formed of the core pieces 101a and 101b, the secondary winding is sandwiched between winding layers obtained by dividing the primary winding into two layers, but the present invention is not limited thereto. That is, the primary winding may be divided into three or more winding layers, and the secondary winding may be sandwiched between the respective winding layers. In this case, a magnetic shield plate is arranged between each of the secondary windings and each of the winding layers. In another case, the primary winding and the secondary winding may be adjacent to each other without dividing the primary winding into a plurality of winding layers. In this case, a magnetic shield plate is arranged between the primary winding and the secondary winding that are adjacent to each other.

The first embodiment is described by taking the exemplary case of applying the present invention to the power conversion device 10 formed of the full-bridge DC/DC converter circuit, but the present invention is not limited thereto, and can be applied to any power conversion device including the isolation transformer 100, which produces the same effect.

As described above, according to the first embodiment, the isolation transformer of the power conversion device is arranged between the primary winding and the secondary winding, and includes the magnetic shield portion configured to interrupt the magnetic flux generated by the current flowing through each of the primary winding and the secondary winding. The first embodiment is described by taking the exemplary case in which the magnetic shield portion is formed of the magnetic shield plate.

In this manner, the magnetic shield plate serving as the magnetic shield portion is placed between the primary winding and the secondary winding of the isolation transformer of an isolated power conversion device, to thereby be able to prevent the magnetic interference between the primary winding and the secondary winding. As a result, it is possible to suppress an increase in resistance value and winding loss of the winding ascribable to an increase in switching frequency of the switching element of the power conversion device. Therefore, it is possible to achieve reduction in size of the isolation transformer without increasing the size of the winding, and as a result, to obtain a compact and highly efficient power conversion device.

Further, the magnetic shield plate is connected to the casing or the heat sink of the power conversion device, to thereby be able to suppress an increase in temperature of the winding, and it is possible to achieve further reduction in size of the isolation transformer.

The first embodiment is described by taking the exemplary case of applying the present invention to the isolation transformer 100 formed of one primary winding and one secondary winding, but the present invention is not limited thereto, and the same effect can be obtained even when the present invention is applied to the isolation transformer 100 formed of a plurality of primary windings and a plurality of secondary windings. That is, the present invention can be applied to the isolation transformer 100 formed of one or more primary windings and one or more secondary windings.

Second Embodiment

The above description of the first embodiment is directed to the isolation transformer 100 in which the magnetic shield portion is formed of the magnetic shield plates 104a and 104b. In contrast, in a second embodiment of the present invention, a description is given of an isolation transformer 110 including a magnetic shield portion different from that of the first embodiment described above. In the second embodiment, the description of the same points as those of the above-mentioned first embodiment is omitted, and different points from those of the above-mentioned first embodiment are mainly described.

Figure 7:
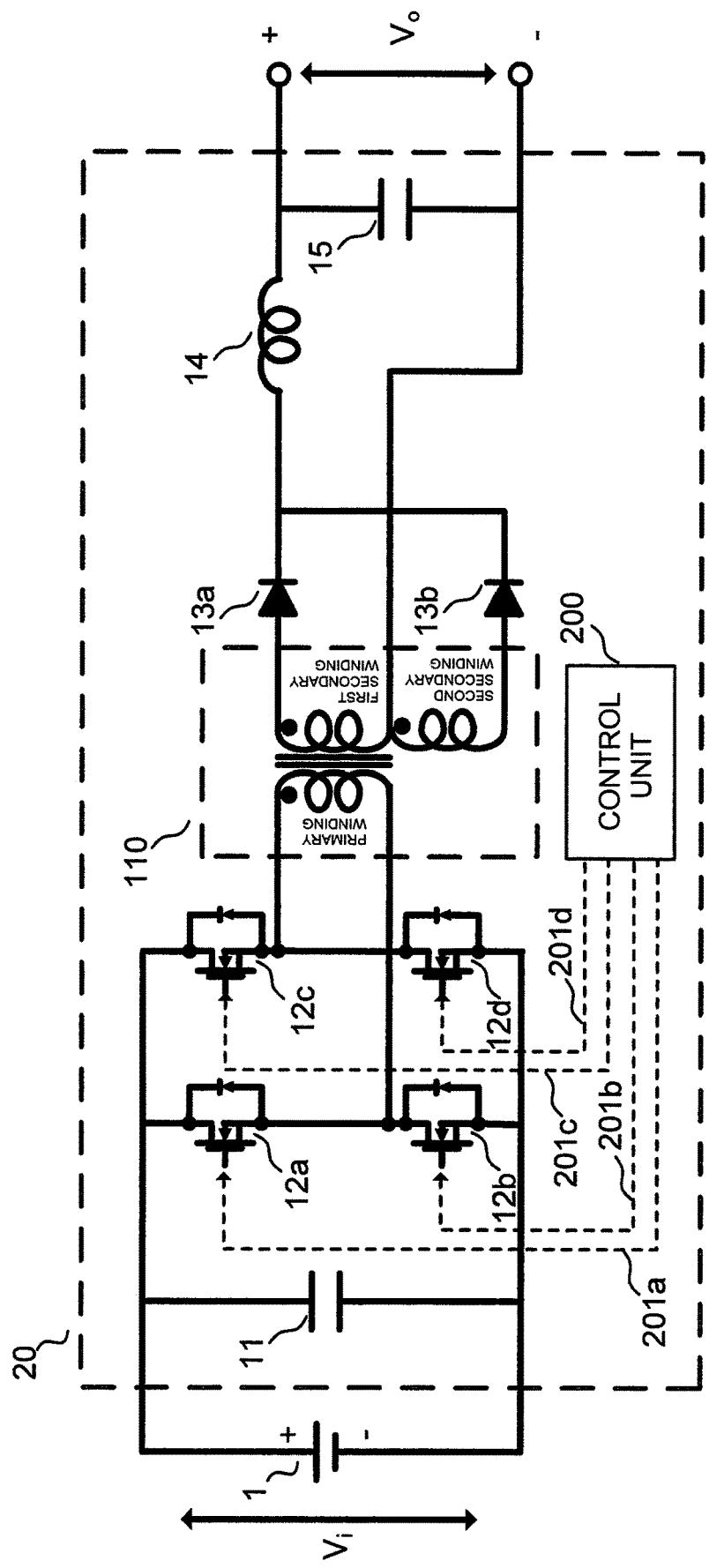
FIG. 7 is a schematic configuration diagram of a power conversion device according to a second embodiment of the present invention.

FIG. 7 is a schematic configuration diagram of a power conversion device 20 according to the second embodiment of the present invention. In this case, the power conversion device 20 has the same basic circuit configuration as that of the power conversion device 10 according to the first embodiment described above, and is formed of a full-bridge DC/DC converter circuit. The power conversion device 20 also includes the isolation transformer 110 being an isolation transformer of a center tap type on its secondary side in place of the isolation transformer 100 in the first embodiment described above.

The secondary winding of the isolation transformer 110 is formed of two windings of a first secondary winding and a second secondary winding that are connected in phase in series. A connection point between the two windings forming the secondary winding is connected to the negative electrode on the output side via one electrode of the smoothing capacitor 15. Both ends of the secondary winding are connected to the anode terminals of the rectifier diodes 13a and 13b so as to rectify voltages generated in the secondary winding.

The cathode terminals of the rectifier diode 13a and the rectifier diode 13b are connected to each other, and their connection point is connected to the positive electrode on the output side via the other electrode of the smoothing capacitor 15.

Next, a description is given of a basic operation principle of the power conversion device 20 illustrated in FIG. 7. A configuration of a circuit connected to the primary winding of the isolation transformer 110 of the power conversion device 20 is the same as the configuration of the circuit connected to the primary winding of the isolation transformer 100 of the power conversion device 10 according to the first embodiment described above, and basic control to be performed on the circuit is also the same. The following description is directed to different points from those of the power conversion device 10 according to the first embodiment described above.

Figure 8:
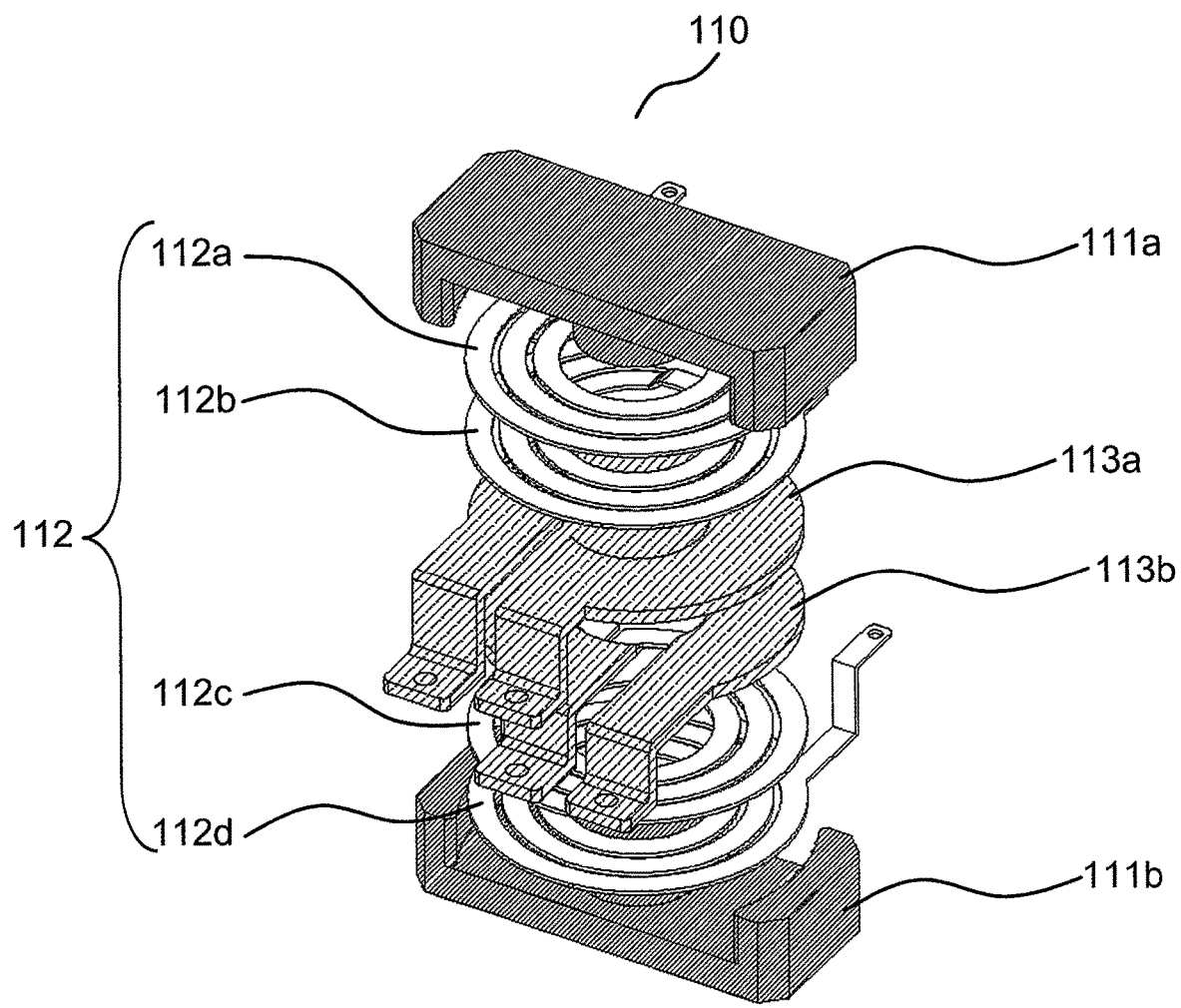
FIG. 8 is a structural view for illustrating an example of a structure of an isolation transformer in the second embodiment of the present invention.

FIG. 8 is a structural view for illustrating an example of a structure of the isolation transformer 110 in the second embodiment of the present invention. In FIG. 8, a structure of the isolation transformer 110 is illustrated by an exploded perspective view.

In FIG. 8, the isolation transformer 110 includes a primary winding 112 divided into two layers of a first winding layer formed of winding portions 112a and 112b and a second winding layer formed of winding portions 112c and 112d, a first secondary winding 113a and a second secondary winding 113b arranged between the layers of the primary winding 112, and the core formed of a core piece 111a and a core piece 111b each having an E-shaped cross section.

The first secondary winding 113a and the second secondary winding 113b, which form the secondary winding, and the primary winding 112 are slid onto protruding portions that protrude from the respective centers of the core piece 111a and the core piece 111b, and the end surfaces of the core piece 111a and the core piece 111b are connected to each other. With this structure, the primary winding 112, the first secondary winding 113a, and the second secondary winding 113b are received in the core.

In this manner, the primary winding 112 is formed of the winding layers obtained by dividing the primary winding 112 into two layers, and the first secondary winding 113a and the second secondary winding 113b are arranged between the winding layers of the primary winding 112.

In FIG. 8, the configuration in which the primary winding is divided into two winding layers is illustrated as an example, but the primary winding may be divided into three or more winding layers. That is, it suffices that the primary winding is divided into at least two winding layers.

Figure 9:
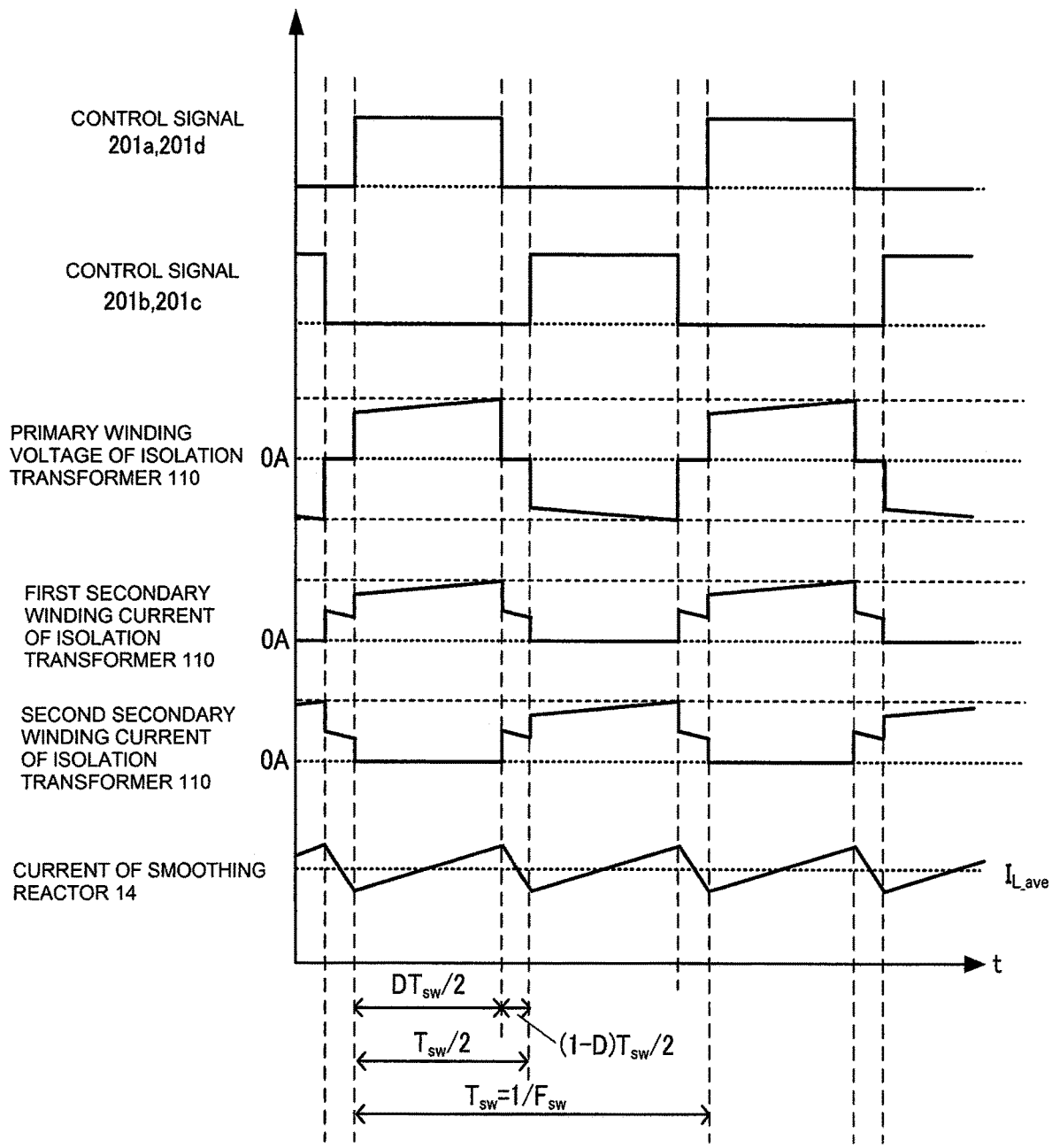
FIG. 9 is a timing chart for illustrating an example of temporal changes of control signals for controlling semiconductor switching elements illustrated in FIG. 7, a current flowing through each of a primary winding, a first secondary winding, and a second secondary winding of the isolation transformer, and a current flowing through a smoothing reactor.

FIG. 9 is a timing chart for illustrating an example of temporal changes of the control signals 201a to 201d for controlling the semiconductor switching elements 12a to 12d illustrated in FIG. 7, a current flowing through each of the primary winding, the first secondary winding, and the second secondary winding of the isolation transformer 110, and a current flowing through the smoothing reactor 14.

As illustrated in FIG. 9, through the switching of the semiconductor switching elements 12a to 12d between on and off, a positive or negative rectangular wave current flows through the primary winding of the isolation transformer 110. When a current flows through the primary winding of the isolation transformer 110, magnetic coupling between the primary winding and each of the first secondary winding and the second secondary winding due to the core tends to cause an induced current to flow through the first secondary winding and the second secondary winding.

In this case, the first secondary winding and the second secondary winding are connected to the rectifier diodes 13a and 13b, respectively. Therefore, depending on whether the current flowing through the primary winding is positive or negative, the states of the first secondary winding and the second secondary winding are each switched between a conductive state and a non-conductive state, and one of the first secondary winding and the second secondary winding is brought to a conductive state, while the other is brought to a non-conductive state.

When the semiconductor switching elements 12a to 12d are all in an off state, the primary winding is brought to a non-conductive state, and a current from the smoothing reactor 14 flows through the first secondary winding and the second secondary winding in an equally shared manner.

Next, a description is given of the principle of reducing the resistance values of the primary winding and the secondary winding in the configuration of the isolation transformer 110 illustrated in FIG. 8.

As described above, in the isolation transformer 110, when the primary winding is in a conductive state, one of the first secondary winding and the second secondary winding that form the secondary winding is brought to a conductive state, while the other is brought to a non-conductive state.

In the configuration of the isolation transformer 110, the secondary winding in a non-conductive state is always inserted between the primary winding and the secondary winding in a conductive state of the first secondary winding and the second secondary winding. Therefore, the secondary winding in a non-conductive state functions as the magnetic shield portion. Therefore, unlike in the first embodiment described above, without requiring to separately provide a magnetic shield plate, it is possible to suppress the magnetic interference between the primary winding and the secondary winding by the secondary winding in a non-conductive state functioning as the magnetic shield portion, and as a result, to reduce the resistance value of the winding.

The power conversion device 20 may be configured such that, when the potential of the casing or the heat sink is set to a negative potential on the output side, a connection point between the two windings of the first secondary winding and the second secondary winding of the isolation transformer 110 is directly connected to the casing or the heat sink. When this configuration is employed, the magnetic shield portion is connected to the casing or the heat sink. With such a configuration of the isolation transformer 110, heat generated in the first secondary winding and the second secondary winding can be directly reduced for cooling, which also contributes to the cooling by reducing the heat generated in the primary winding, and hence it is possible to achieve further reduction in size of the isolation transformer 110.

As described above, according to the second embodiment, in the isolation transformer of the power conversion device, the primary winding is formed of the winding layers obtained by dividing the primary winding into at least two layers, and the secondary winding is formed of the first secondary winding and the second secondary winding. In addition, the first secondary winding and the second secondary winding are arranged between the winding layers of the primary winding, and when the primary winding is in a conductive state, one thereof is brought to a conductive state, while the other is brought to a non-conductive state. Further, the magnetic shield portion is formed of one in a non-conductive state of the first secondary winding and the second secondary winding that are obtained when the primary winding is in a conductive state. With such a configuration, the same effect as that of the first embodiment described above can be obtained.

The second embodiment is described by taking the exemplary case of applying the present invention to the isolation transformer 110 formed of one primary winding and the secondary winding formed of the two windings, but the present invention is not limited thereto, and the same effect can be obtained even when the present invention is applied to the isolation transformer 110 formed of a plurality of primary windings and a plurality of secondary windings. That is, the present invention can be applied to the isolation transformer 110 formed of one or more primary windings and one or more secondary windings.

In the power conversion devices 10 and 20, magnetic interference generated between the primary winding and the secondary winding increases as the numbers of turns of the primary winding and the secondary winding of the isolation transformers 100 and 110 increase, and hence the effect obtained by applying the present invention is further produced. Meanwhile, as the numbers of turns of the primary winding and the secondary winding of the isolation transformers 100 and 110 decrease, the influence of a force (skin effect) that causes the current flowing through the winding to be biased to the surface of the winding due to the influence of magnetism generated by the current itself becomes more dominant, and the effect obtained by applying the present invention decreases. Therefore, in order to obtain a sufficient effect, the number of turns of any one of the primary winding and the secondary winding is desired to be set to more than one.

When the components of the power conversion devices 10 and 20 each include a semiconductor switching element, the semiconductor switching element may be an element formed of, for example, a silicon semiconductor and a wide band gap semiconductor. The wide band gap semiconductor includes a semiconductor using silicon carbide, a gallium nitride-based material, or diamond. The semiconductor switching element formed of a wide band gap semiconductor can be used in a high voltage region difficult in unipolar operation with a silicon semiconductor, and is suitable for high speed switching and ultrahigh carrier frequency operation, which enables the higher switching frequency. Therefore, by applying the present invention to the power conversion devices 10 and 20 including the semiconductor switching element formed of a wide band gap semiconductor, it is possible to further produce the effect, and to achieve further reduction in size of the isolation transformer.

The first embodiment and the second embodiment have been individually described above as embodiments of the present invention, but within the scope of the present invention, the respective embodiments of the present invention can be freely combined, or each of the embodiments can be appropriately modified or omitted.

REFERENCE SIGNS LIST

1 DC power supply, 10, 20 power conversion device, 11 smoothing capacitor, 12a to 12d semiconductor switching element, 13a to 13d rectifier diode, 14 smoothing reactor, 15 smoothing capacitor, 100 isolation transformer, 101a, 101b core piece, 102 primary winding, 102a to 102d winding portion, 103 secondary winding, 104a, 104b magnetic shield plate, 105 slit, 110 isolation transformer, 111a, 111b core piece, 112 primary winding, 112a to 112d winding portion, 113a first secondary winding, 113b second secondary winding, 200 control unit, 201a to 201d control signal

The invention claimed is:

1. A power conversion device, comprising an isolation transformer, the isolation transformer including:
a primary winding;
a secondary winding;
a magnetic shield portion configured to suppress magnetic interference between the primary winding and the secondary winding by interrupting a magnetic flux generated by a current flowing through each of the primary winding and the secondary winding; and
a core formed of a pair of core pieces each having an E-shaped cross section, wherein the magnetic shield portion is formed of a magnetic shield plate arranged between the primary winding and the secondary winding, and wherein the primary winding, the secondary winding, and the magnetic shield plate are slid onto protruding portions that protrude from the respective centers of the pair of core pieces, and the end surfaces of the pair of core pieces are connected to each other.

2. The power conversion device according to claim 1, further comprising a casing configured to receive a component of the power conversion device, wherein the magnetic shield portion is connected to the casing.

3. The power conversion device according to claim 1, further comprising a heat sink configured to cool a component of the power conversion device, wherein the magnetic shield portion is connected to the heat sink.

4. A power conversion device, comprising an isolation transformer, the isolation transformer including:
a primary winding;
a secondary winding; and
a magnetic shield portion configured to suppress magnetic interference between the primary winding and the secondary winding by interrupting a magnetic flux generated by a current flowing through each of the primary winding and the secondary winding;

wherein the isolation transformer includes an isolation transformer of a center tap type on its secondary side, which includes a first secondary winding and a second secondary winding as the secondary winding, wherein the primary winding is formed of winding layers obtained by dividing the primary winding into at least two layers, wherein the first secondary winding and the second secondary winding are arranged between the winding layers, and when the primary winding is in a conductive state, one of the first secondary winding and the second secondary winding is brought to a conductive state, while another one of the first secondary winding and the second secondary winding is brought to a non-conductive state, and wherein the magnetic shield portion is formed of one in the non-conductive state of the first secondary winding and the second secondary winding.

5. The power conversion device according to claim 1, wherein a number of primary windings and a number of secondary windings are each set to one or more.

6. The power conversion device according to claim 1, wherein a number of turns of any one of the primary winding and the secondary winding is set to more than one.

7. The power conversion device according to any one of claim 1, wherein the power conversion device includes a semiconductor switching element, and wherein the semiconductor switching element includes an element formed of a wide band gap semiconductor.

8. The power conversion device according to claim 7, wherein the wide band gap semiconductor includes a semiconductor using silicon carbide, a gallium nitride-based material, or diamond.

* * * * *